March 26, 1963 G. A. MALEY 3,083,305

SIGNAL STORAGE AND TRANSFER APPARATUS

Filed Oct. 6, 1959

INVENTOR
GERALD A. MALEY

BY [signature]

ATTORNEY

United States Patent Office 3,083,305
Patented Mar. 26, 1963

3,083,305
SIGNAL STORAGE AND TRANSFER APPARATUS

Gerald A. Maley, Poughkeepsie, N.Y., assignor to International Business Machines Corporation, New York, N.Y., a corporation of New York Filed Oct. 6, 1959, Ser. No. 844,804
12 Claims. (Cl. 307—88.5)

This invention relates to circuitry for storing and transferring signal information, and more particularly, to such circuitry where the signal storage and transfer may be accomplished in a time sequence through a number of similar stages.

In digital computer apparatus, large numbers of temporary storage circuits are required to hold intermediate computational results while other computations are being made. One type of such storage means is the shift register. These storage media require that information be stored and then read out or transferred in accordance with a time sequence keyed to the timing cycle of the machine. Additionally, computer circuits make use of numerous timing rings for synchronizing machine operation, and counting circuits for indicating the number of operations completed at a particular stage of the apparatus.

The present invention relates to a novel circuit capable of performing all of the above enumerated functions. By utilizing sequential logic techniques in combination with a single type of versatile logic performing network, a circuit is produced which is more economical, simple to construct and service, and reliable than circuits heretofore used to perform the same functions.

Accordingly, it is the principal object of this invention to provide an improved circuit for use in a shifting ring or counter.

It is a further object of this invention to provide such a circuit comprised of a plurality of identical logical networks.

Still another object of this invention is to provide a ring type circuit wherein sequential logic techniques are utilized.

Yet another object of this invention is to provide a multi-function circuit organization using a single type of logical network in a sequential logic switching circuit wherein a simplicity and reliability not heretofore realized is achieved.

Briefly, the circuit of this invention is comprised of a plurality of logical networks each performing the AND-INVERT function, and one or more logical networks performing the INVERT function. These networks are connected in a sequential manner whereby the functioning of one particular circuit is dependent upon the operation of the previous circuit in the sequence as well as information fed back from operation of a succeeding circuit during the previous time cycle. Several feedback paths are included in the circuit to provide the proper sequence of operation. These circuits or stages, may be connected in cascade to form a shifting ring or register, wherein information in any single stage may be shifted successively from one stage to the next in response to shift input timing pulses applied to all stages simultaneously. Accordingly, each stage has a shifting input for the timing pulses and an information input from the preceding stage in the ring. At the output end of each stage is a line providing the input to the succeeding stage as well as an output providing a signal which indicates what information the individual stage is storing at the time the shift input is applied. This latter output may also be used as a source of timing signals or, may provide a count of the number of shift input pulses applied to the ring. One embodiment of the invention utilizes a member of AND-INVERT blocks and an INVERT block. Another embodiment utilizes AND-INVERT blocks, and INVERT block, and a delay which may be of any suitable type.

The foregoing and other objects, features, and advantages of the invention will be apparent from the following more particular description of preferred embodiments of the invention, as illustrated in the accompanying drawings.

Figures 1, 2:
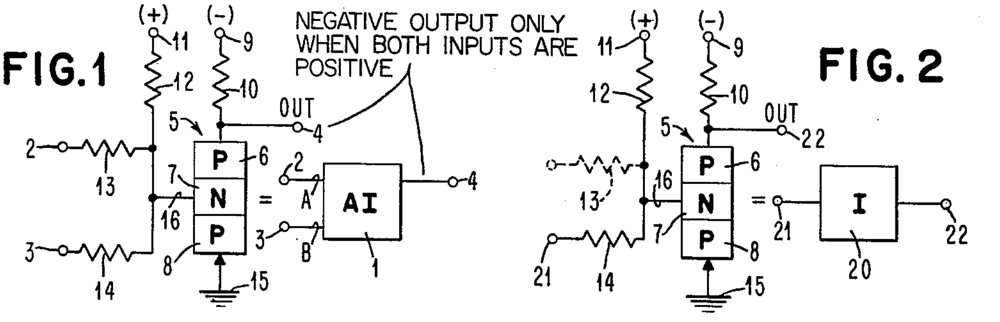
FIG. 1 illustrates a preferred embodiment of the circuitry suitable for the AND-INVERT logical block of the invention.
FIG. 2 illustrates a preferred embodiment of the circuitry suitable for the INVERT block of the invention.

Referring now to FIG. 1 of the drawings, there is illustrated a simple circuit utilizing a transistor which has been found to be particiularly desirable for use as the AND-INVERT block 1 of the invention. As shown, the circuit comprises a transistor 5, illustrated as a PNP transistor of the junction type, having a collector 6, a base 7, and an emitter 8. Negative potential source 9 is connected through resistor 10 to supply bias potentials to the collector 6. Output terminal 4 is connected directly to the collector 6. Emitter 8 is tied directly to reference potential or ground 15. Connected to the base 7 of the transistor via conductor 16 and resistor 12 is a positive potential source 11 of sufficient magnitude to bias the transistor off. Input terminals 2 and 3 are connected through resistors 13 and 14 respectively to lead 16 and thence to the base 7.

As is readily apparent, in the non-conducting or off state of the transistor, the output terminal 4 is at the potential of negative source 9. When the transistor is rendered conductive by application of a suitable signal to its base 7, the output potential rises substantially to ground. For convenience in the ensuing explanation, the output of the transistor in the off condition will be termed the negative level while the output during its conducting time will be termed the positive level. Positive potential source 11 connected to base 7 normally maintains the transistor 5 in its off or non-conductive condition, with the result that its output terminal 4 is at a negative level. The resistors 13 and 14 and resistor 12 are so proportioned that a negative level signal applied at either or both of the terminals 2 and 3 will drive the base sufficiently negative with respect to the emitter 8 that the transistor 5 will go into conduction. It will be understood that in the circuitry in which this building block is used, the inputs 2 and 3 would be the outputs of other similar logical blocks. Therefore, the negative level at the input terminal would be that of the voltage source 9 and the positive level applied thereto will be substantially ground potential When one or more negative signal levels are applied at the input terminals of the block 1, the transistor is conducting, thereby providing a positive signal level in accordance with the convention set up above. Only if both input signals are at the positive level will the transistor of non-conducting and a negative level be available at the output terminal 4. Any logical block therefore, performs two separate functions; an AND function performed by the resistors 12, 13, and 14 which provides a positive level on line 16 sufficient to hold the transistor non-conducting only when both input signals are at a positive level, and an INVERT function performed by the transistor 5. The two inputs to the block 1 are indicated as the A and B inputs, respectively. It will be realized of course that the AND-INVERT function can be performed with other types of transistors as well as other circuit elements which provide the inversion function, and the circuit illustrated is intended merely as an example of such structure.

FIG. 2 illustrates the modification of the AND-INVERT circuit of FIG. 1, adapted to be used as an INVERT block only. Like elements of FIG. 2 have the same numerals as their counterparts of FIG. 1. As can be seen from the circuit illustrated, the INVERT block is merely the AND-INVERT circuit with but a single input. This is a simple inverter circuit whose output varies between a negative level equal to the potential 9 and a positive level substantially at ground potential, in response to positive and negative signal levels respectively at its base. As indicated by the resistor 13 shown in dotted lines, the AND-INVERT block may be used as the INVERT block merely by leaving the terminal of resistor 13 unconnected. In actual practice, the INVERT block is produced in this manner. This permits all of the building block circuits of the invention to be of exactly the same type, thereby enabling printed circuit mass production techniques to be used to fabricate all of the circuitry. All of the necessary assembly will then consist only of connection of the terminals on the frame in which the printed circuit panels are inserted.

Figure 3:
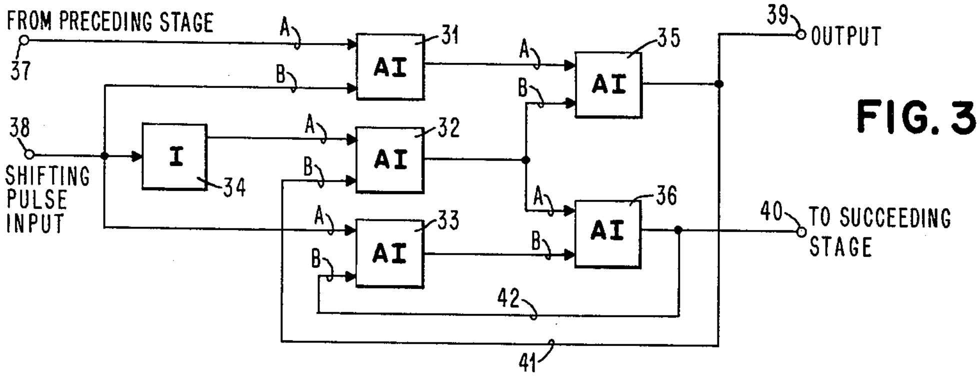
FIG. 3 is a schematic drawing of the circuit of one stage of the invention according to one embodiment.

FIG. 3 illustrates one embodiment of a single shift cell or stage of the invention. Blocks 31, 32, 33, 35 and 36 are AND-INVERT circuits according to FIG. 1 while block 34 is the INVERT block of FIG. 2. Terminal 37 is the information signal input and couples the information stored in the preceding cell to the A input of block 31. Terminal 38 is coupled to the source of shifting or transfer pulses and is connected to the B input of block 31, the A input of block 33 and the input of INVERT block 34. The output of block 31 is connected to the A input of block 35, whose output is tied to the output terminal 39 and, over feedback conductor 41 to the B input of block 32. The output of block 34 provides the A input to block 32. The output of block 32 is connected to both the B input of block 35 and the A input of block 36. The output of block 36 is coupled to the output terminal 40, which would be connected to the input terminal 37 of the succeeding stage, and over lead 42 to the B input of block 33. The output of block 33 provides the B input to block 36.

The shifting stage comprises two portions, an information transfer portion including blocks 31 and 35 which produces at terminal 39, immediately upon occurrence of a shifting pulse, an indication of the input information present at 37 and which is to be transferred into the stage during the shifting pulse and an information storage portion including blocks 33 and 36 which provides during the shifting pulse an output at terminal 40 indicative of the information previously stored therein and upon termination of the pulse, stores the information supplied to terminal 37 from the preceding stage until the next shifting pulse. The shifting pulses may be from any suitable pulse generator producing a train of regularly recurring pulses. The information transferred and stored by the ring will be of the binary type; e.g., a positive level output at terminal 39 or 40 indicates a logical "1" while a negative level output is a logical "0."

Assume first that the stage illustrated is storing information representative of a logical "1" and that the preceding stage is storing a logical "0." Prior to receipt of a shifting pulse then, terminals 37 and 38 are at negative levels and terminals 39 and 40 are at positive levels. Referring back to the explanation of the operation of the individual blocks, this means that the output of block 31 is positive since both its A and B inputs are negative; the output of block 34 is positive since its input is negative; and the output of block 32 is negative since its A input (from block 34) and its B input (from the output of block 35) are both positive. Block 35 has its A input positive but its B input negative to provide the positive output and block 36 has its A input negative (from the output of block 32) and its B input positive, thereby having a positive output. Block 33 has its A input negative and its B input positive, providing the positive B input to block 36.

When the positive shifting pulse occurs, the B input of block 31 goes positive but its output remains positive since its A input is negative. The output of INVERT block 34 goes negative and this renders the output of block 32 positive. The positive A input to block 33 makes its output go negative. Block 35 now has both its A and B inputs positive causing its output to fall negative to thereby indicate that a binary "0" has been transferred to the stage. Block 36 on the other hand, has its A input switched from negative to positive but its B input from positive to negative, thereby maintaining its output at a positive level. The circuit will remain in this condition for the duration of the shifting pulse.

At the conclusion of the shifting pulse, terminal 38 goes negative again and the output of block 34 thus goes positive. The A input to block 33 goes negative and its output now goes positive. Block 32 already had a positive output and block 36 now has both A and B inputs positive, making its output negative. Thus, the binary "0" transferred into the stage during the shifting pulse is stored in the stage. At the same time, the negative input at terminal 38 is conditioning the output of 31 to be positive regardless of whether a positive or negative signal has been stored in the previous stage (which would make terminal 37 similarly positive or negative). The circuit will now stay in this condition until the next shifting pulse. It is noted that the output 39 will remain at the level of the signal transferred into the stage during the shifting pulse until the next shifting pulse.

Assuming that the prior stage had stored a "1" during the above-described cycle, the input A to block 31 goes positive. Its output will remain positive since the B input is negative. When the next shift pulse occurs however, both inputs become positive and its output goes negative. The A input to block 35 is now negative and its output goes positive to indicate that a "1" has been transferred into the stage. At the same time, input A to block 32 has gone negative thereby maintaining the output of the block at a positive level. The change in the A input to block 33 has no effect since its B input is negative. The circuit is stable in this condition for the duration of the shifting pulse.

When the shifting pulse falls, the output of block 34 goes positive, thereby making both A and B inputs to block 32 positive. Its output then goes negative. Block 36 switches to provide a positive output indicative of a stored "1" and output terminal 40 is now positive. As will be apparent from extending the above analysis, internal changes also occur in the circuit which will ready the stage for the next shifting pulse.

Figures 4, 5:
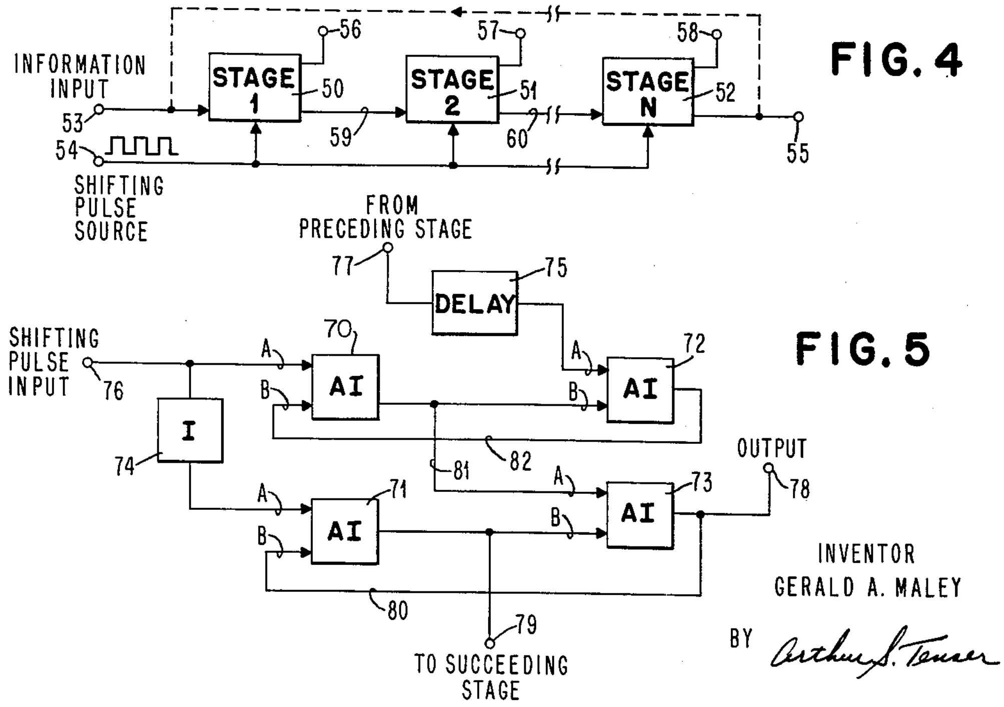
FIG. 4 is a schematic representation of the interconnection of the individual stages to produce a ring.
FIG. 5 is a schematic drawing of a single stage of the circuit according to a second embodiment.

FIG. 4 illustrates the interconnection of the stages of FIG. 3 to form a shifting ring or register. Three stages, 50, 51 and 52 are shown, the latter labeled as Stage N to indicate that any desired number of stages may be cascaded. Information to be entered into the ring or register is applied to the first stage 50 via terminal 53. The shifting pulse source is coupled at terminal 54 to all of the stages. Each of the stages has its counting output 56, 57, 58, respectively and information is transferred from stage to stage over connections 59, 60. Terminal 55 connects the output of the last stage to whatever the next circuit is to be. Lead 61, shown in dotted line, is a feedback connection from the output of the Nth stage to the input of the first stage, which would be used if a continuous ring operation of the circuit is desired, such as for counting or timing purposes. An information signal; e.g. a logical "1," introduced at input terminal 50, will then be shifted successively through stages 50, 51, 52, shifting one stage per shifting pulse. In the case of ring operation, the information signal will circulate indefinitely. When used as a shift register, N shifting pulses will transfer the information through the register to the succeeding circuitry.

Although the stage as shown in FIG. 3 comprises five AND-INVERT blocks, the characteristics of the circuit allows one AND-INVERT block to be shared by each pair of adjacent stages in the ring. It will be seen that the block 33 has a shifting signal input and an input supplied from the output of block 36, which also supplies the A input to the block 31 of the succeeding stage. Both inputs are thus the same as supplied to the block 31 of the succeeding stage and merely by providing an additional output line from block 33, to provide the A input to the block 35, the block 31 may be eliminated. It would then be unnecessary to provide the output terminal 40. Accordingly, when stages are cascaded, only four AND-INVERT circuits per stage would be required.

In FIG. 5 is shown another embodiment of a circuit suitable for use as a single stage of the ring or register of FIG. 4. The arrangement comprises AND-INVERT blocks 70 to 73, INVERT block 74, and a delay element 75. The latter may be of any suitable type, although it has been found that a pair of tandem connected INVERT blocks such as shown in FIG. 2 provides the requisite delay because of the turn-on and turn-off switching delays of the transistors. Use of this form of delay means permits exclusive use of printed circuit cards without addition of any other components.

The shifting or transfer pulse input is connected from terminal 76 to the A input of block 70 and through the INVERT block 74 to the A input of block 71. The information stored in the preceding stage is connected from terminal 77 through delay element 75 to provide the A input to block 72. The delay provided by element 75 permits the switching of block 70 to be completed before any change in signal level is coupled to the A input of block 72. This is required for proper sequential operation.

As will be discussed more fully hereinafter, the actual signal appearing at terminal 77 will be the inverse or complement of the information stored in the preceding stage. The output of block 70 provides the B input to block 72 whose output is fed back over conductor 82 to provide the B input to block 70. The output of block 70 is also connected via conductor 81 to the A input of block 73. The B input of block 73 is provided by the output of block 71. The output of block 73 is coupled to output terminal 78 and also over conductor 80 to the B input of block 71. The output of block 71 is also connected to terminal 79 which provides the information input to the succeeding stage. The output at terminal 78 gives an indication of the information transferred and stored in the stage while the signal level at terminal 79 is indicative of the complement of the information stored in the stage. Blocks 70 and 72 form a first latch circuit which accepts information transferred into the stage while blocks 71 and 73 comprise a second latch circuit in which the information is stored.

Assume first that the stage illustrated in FIG. 5 is storing information representative of a logical "1" and the preceding stage is storing a logical "0." Prior to receipt of the next shifting pulse, input terminal 76 is at a negative level making the A input to block 70 negative and the A input to block 71 positive. The A input to block 72 is positive, since the signal transmitted to terminal 77 from the preceding stage is the complement of the stored "0." The output of block 70 will be positive and thus both inputs to block 72 will be at the positive level. This produces a negative output at block 72 which is fed back over conductor 82 to the B input of block 70. The positive output of block 70 is also supplied to the A input of block 73. The output of block 73, indicative of the information stored in the stage, will be positive and is fed back to provide the B input to block 71. The latter, now having two positive inputs, will provide a negative output. This negative output provides the B input to block 73 and also a negative level at terminal 79. It is noted that this is the complement of the information stored in the stage.

When the shifting pulse goes positive, the A input to block 70 changes to a positive level. However, this block remains unaffected since its B input, from the output of block 72, remains negative. Similarly no change occurs at block 72. The positive shifting pulse is also inverted in block 74 to provide a negative A input to block 71. This switches the block to provide a positive output which is applied to the B input of block 73. The latter now has both inputs positive and its output therefore drops to its negative level. The signal level at terminal 78 therefore, indicates that a "0" has been transferred into the stage. The terminal 79 is now at a positive level; the complement of the "0" transferred into the stage.

When the shifting input falls, the A input to block 70 again goes negative. However the block will not change since its B input was already negative. Assuming that the prior stage had had a "1" transferred into it during the shifting pulse, the A input to block 72 will now be negative, to switch the output of block 72 to a positive level. This is fed back to the B input of block 70 but since its A input is now negative, the output of the block remains at a positive level. The fall of the shifting pulse is also inverted in block 74 to provide the A input to block 71. The latter output, already positive, is unaffected. Thus both inputs to block 73 remain as they were previously and its output remains at the negative level indicative of the "0" being stored in the stage. Likewise the output of block 71 remains unaffected and an input line to the succeeding stage remains at the positive level, the complement of the signal being stored in the stage.

As noted above, during the cycle just described, a "1" was transferred into the preceding stage and the present stage is now storing a "0." When the next shifting pulse occurs, input terminal 76 goes positive, making the A input to block 70 positive. The output of block 72, now positive because the input from the preceding stage is negative (the complement of the "1" stored therein), provides a positive B output to block 70. The latter therefore switches to provide a negative output. This is supplied to the A input of block 73 which then switches to provide a positive output, indicative of the "1" transferred into the stage. The positive shifting pulse is also inverted in block 74 to provide a negative input to block 71. The output of block 71 therefore remains positive.

When the shifting pulse falls, the A input to block 70 goes negative, making its output go positive. Thus the A input to block 73 will be positive regardless of what signal is provided to the A input of block 72 from the preceding stage. Block 74 inverts the negative shifting pulse level to provide a positive A input to block 71. This combines with the positive output of block 73 to render the output of block 71 negative. Considering block 73 more closely, it will be seen that as the A input goes from a negative level to a positive level upon the switching of block 70, the B input is going from a previously positive level to a negative level. Thus, the changes in the inputs are opposite to maintain the block 73 at the same state, i.e., with a positive output. The terminal 79 however, is now negative, indicative of the complement of the "1" now being stored in the stage. Operation of the circuit during succeeding cycles will be similar to that described above.

By applying the operation of the individual stages of FIGS. 3 and 5 to the complete circuit shown in FIG. 4, it will be seen that the ring or register successively transfers the information stored in any one stage to the succeeding stage in a regular recurring manner determined by the repetition rate of the shifting pulse source. Since the individual stages are D.C. or level responsive rather than A.C. or pulse responsive, operation is stable and reliable and the circuit is not subject to actuation by spurious signals. Moreover, the individual stage outputs 56, 57, 58 provide a continuous indication of the stored information rather than a pulse output. These characteristics, when combined with the fact that the entire ring or register may be fabricated from a group of identical printed circuit cards merely by proper interconnection of terminals, render the circuit extremely advantageous for use in digital computers intended for widespread general application.

While the invention has been particularly shown and described with reference to a preferred embodiment thereof, it will be understood by those skilled in the art that various changes in form and details may be made therein without departing from the spirit and scope of the invention.

What is claimed is:

1. A stage for use in a shifting ring composed of a number of such stages, each stage comprising, a plurality of logical networks each performing AND and INVERT logical functions, a source of information signal, a single source of shifting signals, first means including a first pair of said networks responsive to said information and shifting signals to produce an output indicative of the content of said information signal, second means including a second pair of said networks responsive to said shifting signal and the output of said first pair of networks to store the content of said information signal and a single output circuit to a succeeding stage connected to the second means.

2. A signal storage and transfer circuit comprising, first, second, third, fourth and fifth logical networks, each having a plurality of inputs, an output, and performing the AND-INVERT logical function, a source of information signals, a source of transfer signals, means coupling said source of information signals to one input of said first network, means coupling said transfer signal source to another input of said first network and to one input of each of said second and third networks, the coupling to said second network providing a phase inversion, means coupling the output of said first network to one input of said fourth network, means coupling the output of said third network to one input of said fifth network, means coupling the output of said second network to other inputs of each of said fourth and fifth networks, means connecting the output of said fourth network to another input of said second network, and means connecting the output of said fifth network to another input of said third network, the output of said fourth network providing an indication of the information transferred into the stage and the output of said fifth network providing an indication of the information stored in the stage.

3. In a multistage signal storage and transfer circuit, a plurality of stages each comprising the apparatus of claim 2 above, wherein the output of said fifth network of each stage provides the source of information signals coupled to said one input of said first network of the succeeding stage.

4. In a multistage signal storage and transfer circuit, a plurality of stages each comprising the apparatus of claim 2 above, wherein said third network of any given stage additionally performs the function of said first network of the succeeding stage, whereby the total number of networks required per stage is reduced.

5. A multistage signal storage and transfer circuit as defined in claim 4 above, further comprising means connecting the output of said fifth network of the last stage to said one input of said first network of the first stage, whereby continuous ring type of operation is obtained.

6. A signal storage and transfer circuit, comprising, first, second, third, and fourth logical networks, each having a plurality of inputs, an output, and performing the AND-INVERT logical functions, a source of information signals, a source of transfer signals, means coupling said transfer signal source to one input of each of said first and second networks, the coupling to said second network providing a phase inversion, means coupling the outputs of said first and second networks to one input of each of said third and fourth networks respectively, means connecting the outputs of said third and fourth networks to another input of each of said first and second networks respectively, whereby said first and third networks and said second and fourth networks form a pair of latches, means including a delay coupling said source of information signals to another input of said third network, and means coupling the output of said first network to another input of said fourth circuit, the output of said fourth circuit providing an output indicative of this information transferred into the stage and the output of said second network providing an output indicative of the information stored in the stage.

7. In a multistage signal storage of transfer circuit, a plurality of stages each comprising the apparatus of claim 6 above, wherein the output of said second network of each stage provides the source of information signals coupled to said third network of the succeeding stage.

8. A multistage signal storage and transfer circuit as defined in claim 7 above, further comprising means connecting the output of said second network of the last stage, to said another input of said third network of the first stage, whereby continuous ring type of operation is obtained.

9. A stage for use in a shifting ring comprising, a first pair of logic blocks, means connecting the output of each of said first pair to an input of the other of said first pair, a second pair of logic blocks, means connecting the output of each of said second pair to an input of the other of said second pair, means coupling the output of one of said first pair of logic blocks to an input of one of said second pair of logic blocks, a source of shift pulses coupled to an input of one logic block of each of said first and second pairs, a source of information signals, means coupling said information signal source to an input of one block of said first pair, and means coupled to an output of one block of said second pair for providing an information signal to a succeeding stage.

10. The apparatus of claim 9 above wherein each of said logic blocks performs both AND and INVERT logical functions.

11. The apparatus of claim 9 above wherein said means coupling said information signal source to an input of one block of said first pair comprises an additional logic block whose inputs are said information signal source and said shift signal source.

12. The apparatus of claim 9 above wherein said means coupling said information signal source to an input of one block of said first pair comprises a delay means.

References Cited in the file of this patent

UNITED STATES PATENTS

| | | |
|---|---|---|
| 2,781,447 | Lester | Feb. 12, 1957 |
| 2,808,203 | Geyer | Oct. 1, 1957 |